US009869286B1

(12) United States Patent
Clark

(10) Patent No.: US 9,869,286 B1
(45) Date of Patent: Jan. 16, 2018

(54) VEHICLE ROLLOVER SAFETY DEVICE

(71) Applicant: Carl M. Clark, Albuquerque, NM (US)

(72) Inventor: Carl M. Clark, Albuquerque, NM (US)

( * ) Notice: Subject to any disclaimer, the term of this patent is extended or adjusted under 35 U.S.C. 154(b) by 232 days.

(21) Appl. No.: 14/944,818

(22) Filed: Nov. 18, 2015

Related U.S. Application Data

(60) Provisional application No. 62/081,127, filed on Nov. 18, 2014.

(51) Int. Cl.
F02N 11/08 (2006.01)
H01H 50/32 (2006.01)

(52) U.S. Cl.
CPC ......... F02N 11/0803 (2013.01); H01H 50/32 (2013.01); H01H 2231/026 (2013.01)

(58) Field of Classification Search
CPC ................ F02N 11/0803; H01H 50/32; H01H 2231/026
See application file for complete search history.

(56) References Cited

U.S. PATENT DOCUMENTS

| 3,882,957 | A | * | 5/1975 | Fritz | B60K 28/14 180/284 |
| 4,717,904 | A | * | 1/1988 | Murakami | B60Q 1/52 340/436 |
| 5,204,814 | A | * | 4/1993 | Noonan | A01D 34/008 180/168 |
| 5,572,969 | A | * | 11/1996 | Coughlin | B60K 28/14 123/198 DC |
| 6,397,133 | B1 | * | 5/2002 | van der Pol | B60R 16/0233 180/282 |
| 6,728,616 | B1 | * | 4/2004 | Tabe | B60R 21/017 180/268 |
| 8,314,686 | B2 | * | 11/2012 | Kirtley, Jr. | B66F 9/0755 187/223 |
| 8,475,275 | B2 | * | 7/2013 | Weston | A63H 30/04 463/30 |
| 8,798,825 | B1 | * | 8/2014 | Hartman | B63B 39/03 701/21 |
| 2003/0088349 | A1 | * | 5/2003 | Schubert | B60R 21/013 701/36 |
| 2004/0068354 | A1 | * | 4/2004 | Tabe | B60R 22/48 701/45 |
| 2006/0089762 | A1 | * | 4/2006 | Kurokawa | F02D 17/04 701/21 |
| 2008/0208417 | A1 | * | 8/2008 | Buehlmann | E01C 19/006 701/50 |

(Continued)

Primary Examiner — Hung Q Nguyen
Assistant Examiner — Brian P Monahon

(57) ABSTRACT

A vehicle safety rollover device, that upon detection of a vehicle rollover, automatically shuts-off power to an ignition system of said vehicle and shuts down an electrical system of said vehicle. Power flows through a first latching relay switch to an ignition starter, and a second latching relay switch disconnects the electrical shutoff signal from the power input. When a sensor is activated, power flows from the power input to the set pins of the latching relay switches, causing the relay switches to switch positions from the first output position to the second output position. This causes power to the ignition starter to be disconnected, and power to flow to the electrical shutoff signal via the second latching relay switch, thereby causing the electrical system of the vehicle to shut down.

10 Claims, 7 Drawing Sheets

(56) References Cited

U.S. PATENT DOCUMENTS

| | | | | |
|---|---|---|---|---|
| 2008/0306653 A1* | 12/2008 | Hasegawa | ............... | B62K 25/04 701/38 |
| 2009/0314566 A1* | 12/2009 | Rust | .................... | B62D 33/067 180/89.14 |
| 2010/0052882 A1* | 3/2010 | Sverrisson | ............... | B60R 25/10 340/426.11 |
| 2010/0191408 A1* | 7/2010 | Boylston | .................. | G01C 9/00 701/31.4 |
| 2011/0073065 A1* | 3/2011 | Jacobson | ................. | F01M 1/02 123/196 R |
| 2011/0253093 A1* | 10/2011 | Namba | ................. | F01M 11/064 123/196 S |
| 2012/0016544 A1* | 1/2012 | Pariseau | ............... | B60L 3/0038 701/22 |
| 2012/0185165 A1* | 7/2012 | Geelen | ................... | G01C 21/26 701/436 |
| 2012/0245803 A1* | 9/2012 | Bettany | ................... | E02F 3/964 701/50 |
| 2013/0110376 A1* | 5/2013 | Surnilla | ................ | F02D 41/042 701/103 |
| 2013/0116858 A1* | 5/2013 | O'Dwyer | ................ | B60R 25/00 701/2 |
| 2013/0207577 A1* | 8/2013 | Natsume | ............... | B60S 1/0896 318/286 |
| 2014/0110952 A1* | 4/2014 | Lange | .................... | E05B 81/76 292/129 |

\* cited by examiner

VEHICLE ROLLOVER SAFETY DEVICE

CROSS REFERENCE

This application claims priority to U.S. Provisional Patent Application No. 62/081,127 filed Nov. 18, 2014, the specification(s) of which is/are incorporated herein in their entirety by reference.

FIELD OF THE INVENTION

The present invention relates to automobile safety, namely, a rollover safety device that detects when a vehicle rolls or flips over, shuts off the engine and fuel pump, and supplies a signal to disconnect electrical power.

BACKGROUND OF THE INVENTION

Rollover crashes are one of the most significant safety problems for all classes of light vehicles especially light trucks (pickups, sport utility vehicles, and vans—LTVs). For 1992 through 1996, there was an average of approximately 227,000 rollover crashes per year. (Rollover crashes are ones in which rollover is the first harmful event.) These rollovers resulted in an average of 9,063 fatalities per year (29 percent of all light vehicle fatalities) and over 200,000 non-fatal injuries per year. In terms of fatalities per registered vehicle, rollovers are second only to frontal crashes in their level of severity. The rollover problem is more serious for light trucks, especially sport utility vehicles. State crash data indicates that, for all types of collisions, LTV's are only in 68 percent as many crashes per registered vehicle as are passenger cars.

A major problem in rollover accidents is the release of fuel, which can trigger a fire and greatly increase the injury and fatality rate in rollover accidents. Thus, a goal of vehicle safety is to disable the fuel pump and engine when a rollover occurs as well as electrical sources of ignition such as the starter and electrical system. Disabling the starter and electrical system reduces the chances of igniting a fire if fuel escapes.

In the US alone and at the start of 2014, there exist approximately 241 million registered passenger vehicles without rollover safety. In 2014, it is expected that an additional 16 to 17 million more will be added to the tally. This document describes one version of such a device that is sufficiently generic to apply rollover safety to all vehicles new enough to have an electric fuel pump.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The invention comprises a rollover safety device that automatically shuts off both the engine and electric fuel pump in the instant the vehicle rolls or flips over a critical angle in any direction. The angles used to determine excessive tilt tend to vary by vehicle application. For instance, box shaped vehicles typically tip on their sides but rarely continue to roll over. The device can be configured to trigger at a desired tilt angle depending on the vehicle type. The device is designed to be resettable with manufacturer support after such an accident. Once set due to a rollover, the device remains set independent of power until it is reset by a trained technician.

By shutting off power to the fuel pump and starter, and shutting off the engine, the invention promises to reduce fires and explosions resulting from severe rollover accidents. In addition to saving lives, by reducing the hazards of rollover accidents, liability claims from rollover accidents can be reduced. The invention is relatively simple and cost-effective to construct, and is advantageous by not requiring power to keep the engine and fuel pump inoperative.

Considerable engineering has gone into the invention to make it cost effective and functional in extreme temperatures. The rollover sensor is custom designed to be Reduction of Hazardous Substances (ROHS) compliant, non-false triggerable and when applied in parallel, as much unit redundancy may be achieved as needed.

According to one embodiment, the subject disclosure features a vehicle safety rollover device, that upon detection of a vehicle rollover, automatically shuts-off power to an ignition system of said vehicle and shuts down an electrical system of said vehicle. The device may comprise at least one power input; a ground input operatively connected to a vehicle common ground; at least two latching relay switches each comprising an input, two output positions, a set pin, and at least one reset pin connected to the ground input; an ignition start input operatively connected to the input of the first latching relay switch; an ignition start output operatively connected to the first output position of the first latching relay switch; an electrical shut-off signal operatively connected to the second output position of the second latching relay switch; and at least one sensor configured to supply power to the set pins of the latching relay switches when the sensor is activated. An initial position of the latching relay switches is in the first output position. The input of the second latching relay switch is operatively connected to the power input. When power is supplied to the set pin, the position switches to the second output position.

Initially, power can flow through the first latching relay switch to an ignition starter of the ignition system, and the second latching relay switch disconnects the electrical shut-off signal from the power input. When the sensor is activated, power flows from the power input to the set pins of the latching relay switches, causing the relay switches to switch positions from the first output position to the second output position. This causes power to the ignition starter to be disconnected, and power to flow to the electrical shutoff signal via the second latching relay switch, thereby causing the electrical system of the vehicle to shut down.

In one aspect, the power is supplied from a battery power. In another aspect, the power is supplied from an alternator power. In yet another aspect, the power is supplied from an alternator power and a battery power. The alternator power may be connected to the sensor, the sensor may be connected to the set pin of the first latching relay switch, and the battery power may be connected to the input of the second latching relay switch.

In some embodiments, the sensor is a tilt sensor comprising a conductive tube; a conductive ball bearing disposed within the conductive tube; a top end cap composed of an insulating material containing a printed circuit board disposed on a top end of the tube; a conductive pin disposed on the top end cap and operatively connected to the battery power; and a transistor comprising a base pin, a collector pin, and an emitter pin. The ball bearing is in electrical contact with an inner surface of the conductive tube. The base pin is connected to the conductive tube. The collector pin is connected to the alternator power. The emitter pin is connected to the latching relay switches. The tilt sensor may be fixed to the body of the vehicle. When the tilt sensor is upright position relative to gravity, the ball bearing rests on the bottom of the tube, causing the sensor to form an open circuit. When the tilt sensor is tilted at least 90° relative to gravity, the ball bearing rolls onto the conductive pin to activate the tilt sensor, The tilt sensor forms a closed circuit such that current can flow through the conductive pin, the ball bearing, and tube. The current flows to the base pin of the transistor to open an electrical path from the battery power to the set pins of the latching relay switches.

In other embodiments, the device may further comprise two tilt sensors, wherein the two tilt sensors are connected in parallel, wherein the two tilt sensors are oriented at opposite angles, such that when the vehicle tilts in either direction by an angle sufficient to make at least one of the tilt sensors to tilt by more than 90° relative to gravity, one of the tilt sensors is activated.

In another embodiment, the sensor is a water submergence sensor configured to send a set signal when the vehicle is submerged in water. In yet another embodiment, the sensor is triggered by a panic button on a key chain.

In still other embodiments, the device may further comprise four latching relay switches. Two ignition switch motor-on inputs may be connected to the inputs of the third and fourth latching relay switches. Two ignition switch motor-on outputs may be connected to the first outputs of the third and fourth latching relay switches. Initially, power flows through the third and fourth latching relay switches to the alternator power. When the sensor is activated, power flows from the power input to the set pins of all four latching relay switches, causing the relay switches to switch positions. This causes power to the ignition motor-on inputs and the ignition starter to be disconnected, and power to flow to the electrical shutoff signal, thereby causing the electrical system of the vehicle to shut down and disable all accessories.

In further embodiments, the device may comprise a dual in-line package (DIP) switch having a plurality of DIP switch positions. Each latching relay switch has two reset pins. In one aspect, connecting the first reset pin to the ground input causes the latching relay switch to switch to the second output position when power is applied to the set pin. In another aspect, connecting the second reset pin causes the relay switch to switch to the first output position when power is applied to the set pin. The DIP switch positions are connected to the two reset pins of the latching relay switches, and the final position of the DIP switch bypasses the sensor. The DIP switches are nominally set such that the ground input is connected to the first reset pin and disconnected from the second reset pin. To reset the device, the DIP switch positions are reversed so that the ground input is connected to the second reset pin of each relay switch. When the final DIP switch position is flipped, power is supplied to the latching relay switches, which causes them to switch to the original first output position. This causes the device to reset and the DIP switch positions to be reversed to their original positions. As a result, the DIP switch permits all logic in the device to be tested prior to release.

DESCRIPTION OF PREFERRED EMBODIMENTS

Following is a list of elements corresponding to a particular element referred to herein:

| | |
|---|---|
| 100 | safety device, or alternatively, electrical circuit |
| 101-103, 117 | latching relay switches |
| 104 | alternator power |
| 105 | ground input |
| 108 | battery power |
| 110 | ignition switch motor-on input |
| 111 | ignition start input |
| 112 | electrical shut-off signal |
| 113, 114 | ignition switch motor-on outputs |
| 115 | ignition start output |
| 119-127 | DIP switch positions |
| 133 | transistor |
| 200 | sensor |
| 201, 301 | top end cap, or alternatively, printed circuit board (PCB) end cap |
| 205 | sensor tray |
| 203, 303 | conductive ball bearing |
| 205, 305 | conductive tube |
| 202, 206, 307 | conductive pins |
| 306 | second contact point |
| 500 | housing |
| 501 | pressure formed sensor tray |
| 502 | desiccant |
| 503 | plastic bag |
| 504 | back plate |
| 505 | front plate |

Referring to FIGS. 1-8, the present invention is a vehicle rollover safety device comprising a custom sensor and circuit to detect a vehicle rollover and shut off power to the fuel pump, starter and engine when a rollover is detected.

Figure 1:
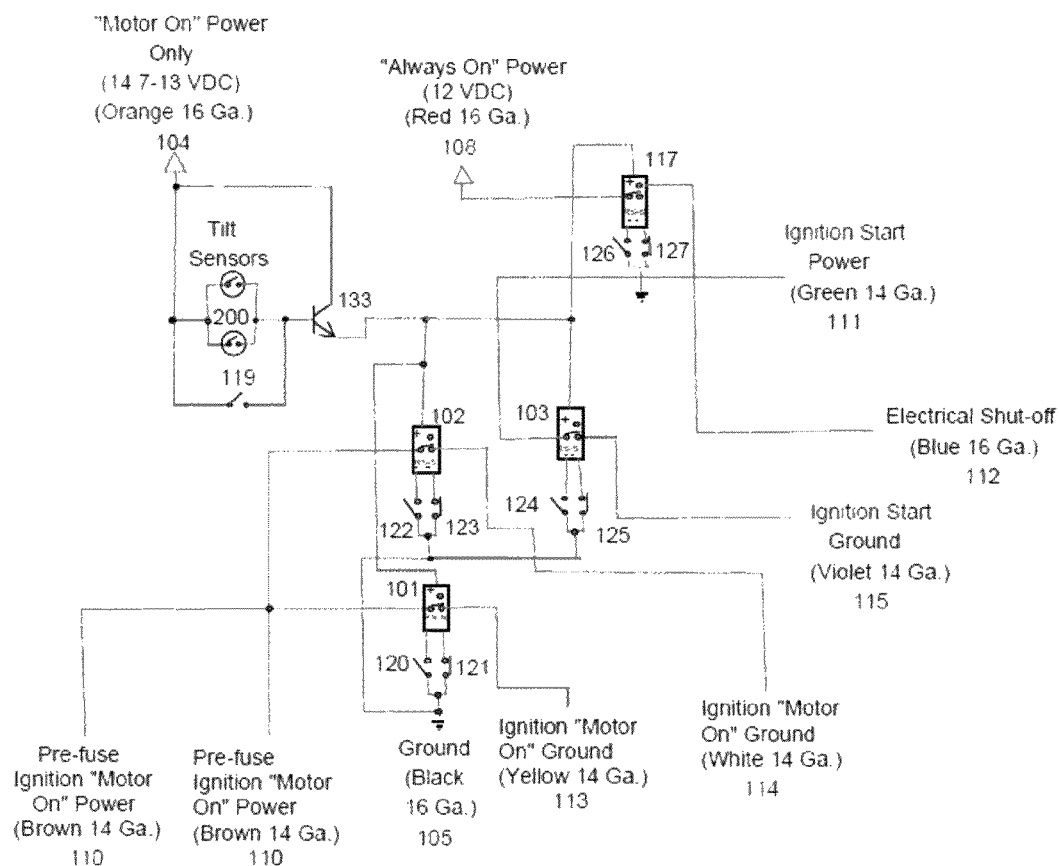
FIG. 1 shows an electrical circuit diagram of the present invention.

As shown in FIG. 1, an embodiment of the present invention comprises a circuit utilizing four latching relay switches (101, 102, 103, 117) that control power; the ignition motor-on power, the ignition start power and an electrical shutoff signal line. The circuit board contains a 9-position DIP switch (119-127) which can be configured to allow for testing of the various features. The circuit has 9 electrical inputs: alternator power (104), ground (105), battery power (108), input and output ignition start leads (111, 115), input and output ignition motor-on power (110, 114, 115), and an electrical system shutoff lead (112). In a nominal configuration, the DIP switches (121, 123, 125, 127) are set such that ground is connected to the first reset pin of the four latching relay switches (101, 102, 103. 117). The first latching relay (103) is connected to the input and output ignition start lines (111,115) such that it nominally acts as a closed switch, allowing power to flow to the ignition start. The second latching relay is connected to the electrical shutoff line, such that it nominally acts as an open switch. DIP switch positions (121, 123, 125 and 127) are set to allow the negative terminals of the relay switches to contact ground. In a starting condition, the four relays switches are set so that power can flow through the ignition motor on power and the ignition start.

In an alternative embodiment, the ignition start leads are instead connected to the fuel pump power, such that the fuel pump is shut off when the device is triggered.

When the sensor is triggered, a small amount of current flows through the sensor to the base terminal of the transistor (133). This allows sufficient current to flow through the transistor to the set pins of the latching relays (101,102, 103), causing the relay switches to latch so that the switches are now open and power cannot flow to the ignition start or motor on power. In addition, power now flows from the battery power (108) to the electrical shutoff switch (112). Thus when the sensor is activated, power is cut to the ignition system, and electrical shutoff is activated.

Figure 2:
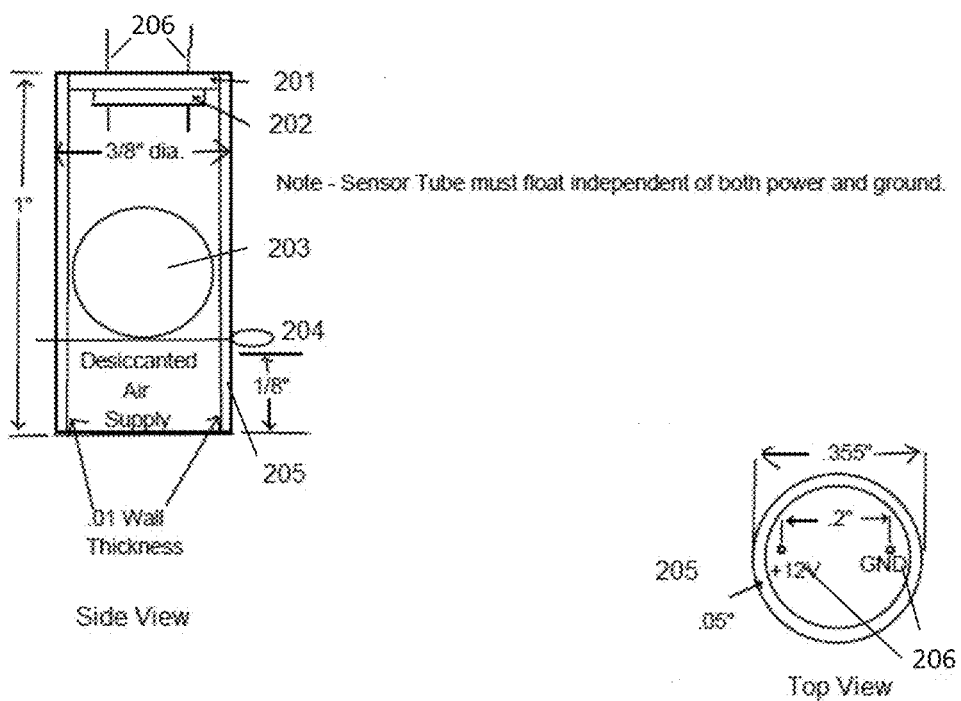
FIG. 2 shows a top and side view diagram of the tilt sensor of the present invention.

As shown in FIG. 2, an embodiment of the tilt sensor (200) comprises an electrically conductive rolling ball bearing (203) encased within a tube (205). The tube is capped on the bottom end, while the top end contains a PCB end cap (201) with two conductive pins (202). When the tube is upright relative to gravity, the bearing rests on the sensor tray (205) near the bottom end of the tube. In another embodiment, a wire is attached to the tube end so that the full length of the tube can be used. In this case, the sensor acts as an open switch. When the tube tilts so that the ball bearing contacts the pins, current can flow through the pins and the sensor acts as a closed switch.

In an alternative embodiment, the tube is conductive, and the PCB contains a single conductive pin, thus the tube and the conductive pin act as the two leads of the sensor. In some embodiments a second pin is attached to the tube.

The tilt sensor can be adjusted by placing it on the vehicle at an angle from vertical, so that it triggers when the vehicle tilts in one direction by the specified angle. For example, in some embodiments, the vehicle may roll or flip over at a critical angle of about 135° to 180° in any direction. The tilt sensor will be places at 135° to 180° degree angle so as to trigger when the vehicle hits this region. In other embodiments, it is desired that the device trigger when the vehicle rolls or flips over at a critical angle of about 90° in any direction, for example, box-shaped vehicles that tip on their sides. A tip angle measurement of about 45° to 70° may be useful for engine and fuel pump shut off for these type vehicles. Examples of box shaped vehicles are buses, ambulances, semi-trucks, delivery trucks, mail trucks, and jeeps. A plurality of tilt sensors may be used in parallel oriented in orthogonal directions, so that if the vehicle rolls in any direction, the shutoff system will be activated.

In some embodiments, a sensor interface is independent of tip sensitivity and can measure critical forward flip, left roll, right roll, and reverse flip. In some embodiments, the sensor interface is additionally plug-compatible with the existing circuit design of the vehicle.

In alternative embodiments, other sensors can also be used, allowing the device to be configurable for a number of other applications.

Figure 3:
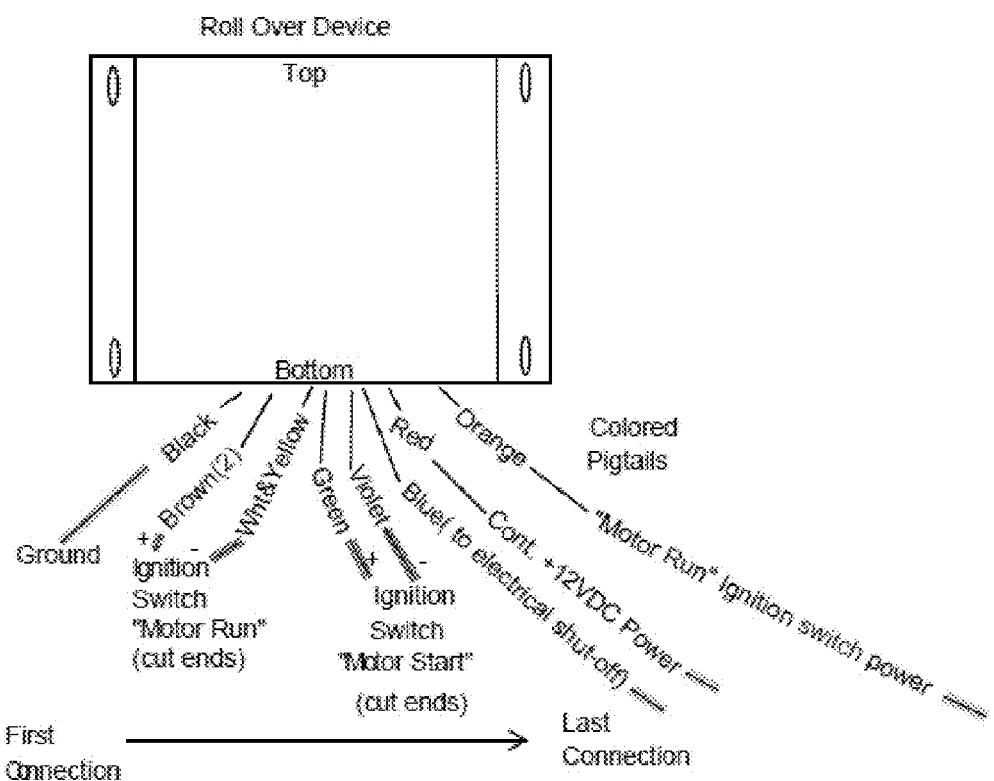
FIG. 3 shows a wiring diagram of the present invention.

As shown in FIG. 3, the safety device has 10 input leads. The first input lead is red for battery power. The second input is black for ground. The third input is orange for alternator power. The fourth and fifth inputs are violet and green and are typically connected to the ignition start or fuel pump, such that current must flow through the device to reach the ignition start or fuel pump. The sixth and seventh inputs are brown and are connected to the ignition motor on power inputs. The eighth and ninth are white and yellow and are connected to the motor-on power outputs, such that current must flow through the device for power to reach any electrical accessories. The tenth input is connected to the electrical shutoff.

Referring to now FIG. 3, the following is a non-limiting example of installing the safety device in a vehicle:
1) Mount the back plate of the housing (500) to the engine firewall such that the housing top (side opposite wiring) is level. Place screws in flanges at vertical extremes so housing (500) position remains stable.
2) For the following steps 3 through 11, connect wiring with wire nuts to all unit pigtails. Connect opposite end wiring permanently.
3) Locate existing ground and connect it up to Black wire pigtail.
4) Locate the Ignition Switch "Start" wire and cut it at its easiest point.
5) Join the "Start" wire positive end together with the Rollover units Green pigtail
6) Join the "Start" wire negative end with the Violet pigtail.
7) Locate the Ignition Switch "Motor Run" wire leading to the fuse box.
8) Identify an accessible point to cut it and sever it.
9) Join the "Motor Run" wire positive end together with both the Rollover Units Brown Pigtails using 12 Ga. Wire
10) Join the "Motor Run" wire negative end with the unit White and Yellow pigtails using 12 Ga. wire.
11) Tape, roll up and cable tie the Blue wire until electrical shut-off is available.
12) Locate existing +12V power and place the appropriate connections on ends of Red 16 Ga. wire to connect it to the Red pigtail.
13) Test to confirm the engine starts normally.

Figure 4:
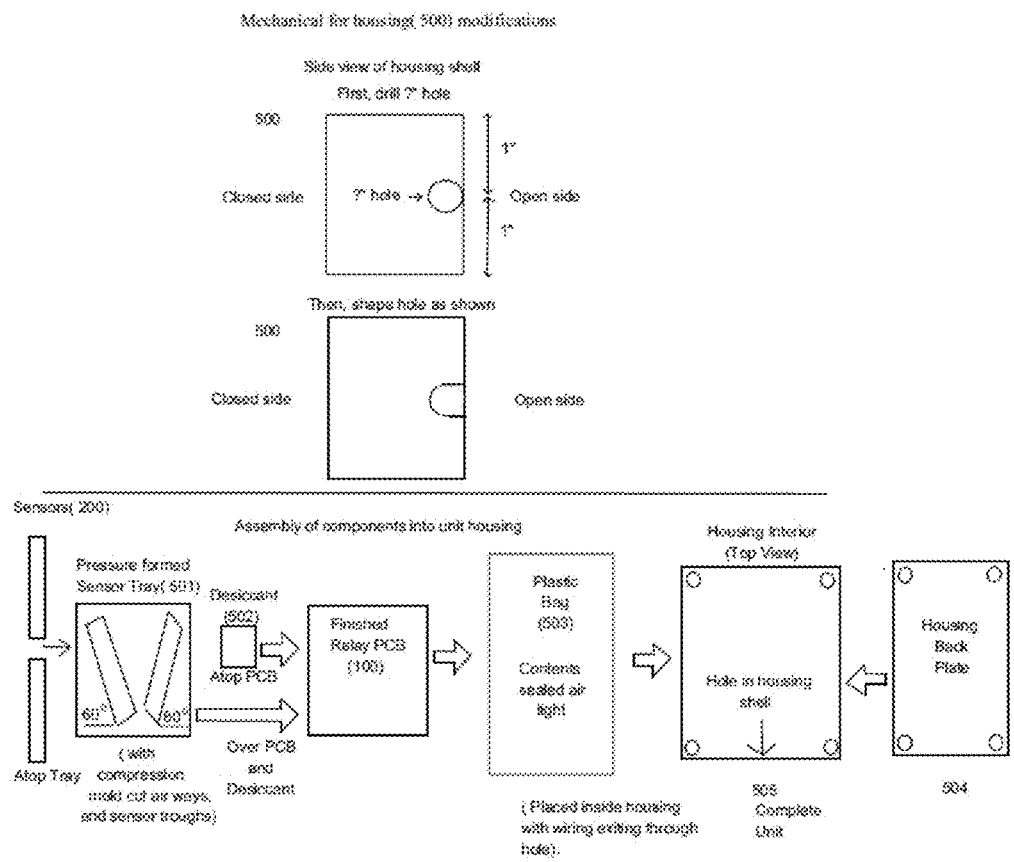
FIG. 4 shows a figure that details machine work necessary to the unit housing and stuffing of the housing with the unique components that enhances the unit's longevity.
Figure 5:
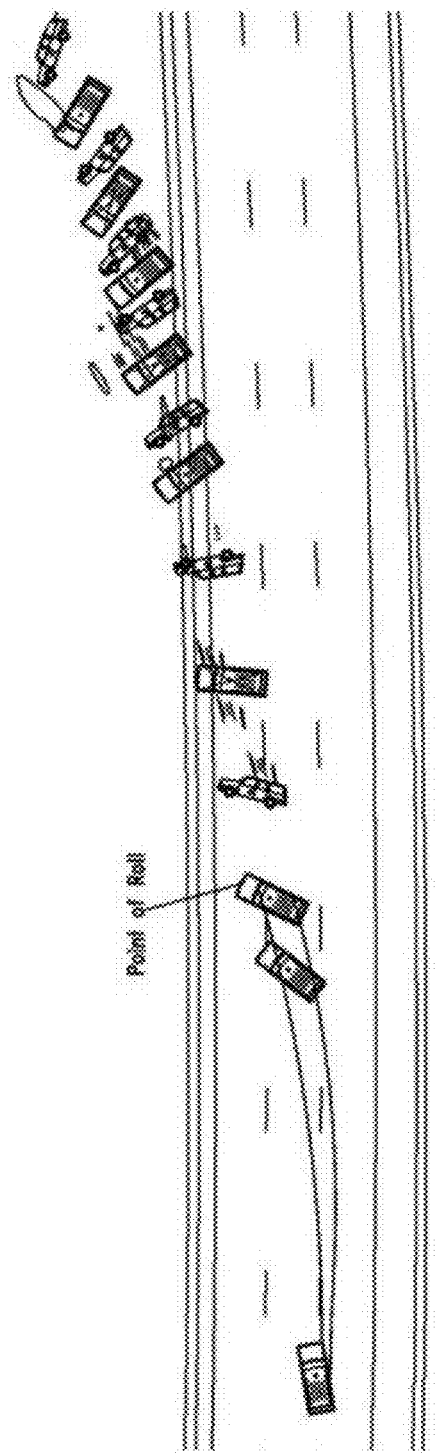
FIG. 5 shows a schematic of a vehicle roll-over.

As shown in FIG. 4, in one embodiment the device is encased in a housing (500). Two tilt sensors are embedded in a pressure formed sensor tray (501), at opposite angles (for example, at a 60 degree angle). Thus if the vehicle tilts by +/−60 degrees at least one tilt sensor will activate. The sensor tray is joined with the PCB containing the electrical circuit (100), and is sealed in a plastic bag (503) containing a desiccant (502). The housing has a back plate (504) and a front plate (505) with a hole exiting the side to allow wiring to enter and exit the housing.

In an alternative embodiment, the safety device may include push buttons that permit the latching relays to be reset when a button is pushed or reset by RF control. In this embodiment, the device could be used to apply optional practical security to every vehicle. In this embodiment, the invention additionally comprises two separate lines between a push button switch on the steering column and the Relay PCB that just carries the toggle engine status signal. The circuit is configured so that the engine electrical shutoff is triggered if the push button is not pressed.

Figure 6:
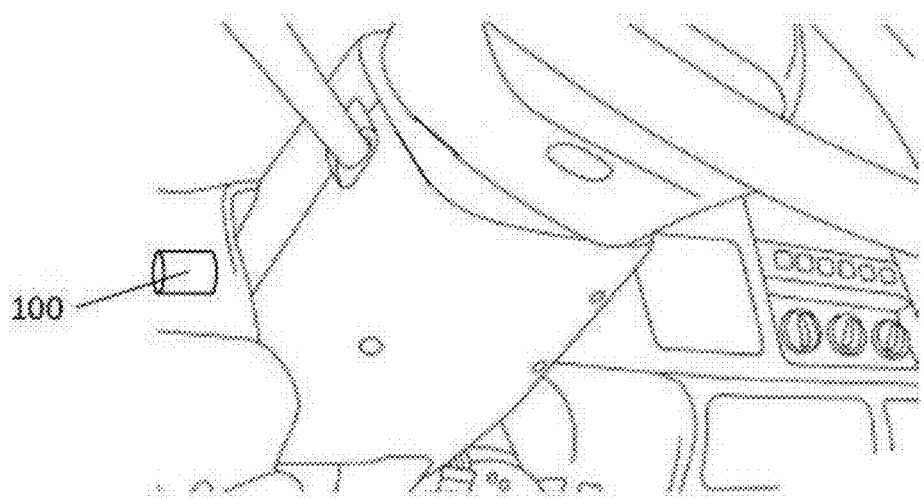
FIG. 6 shows an embodiment where the safety device is mounted near the steering column.
Figure 7:
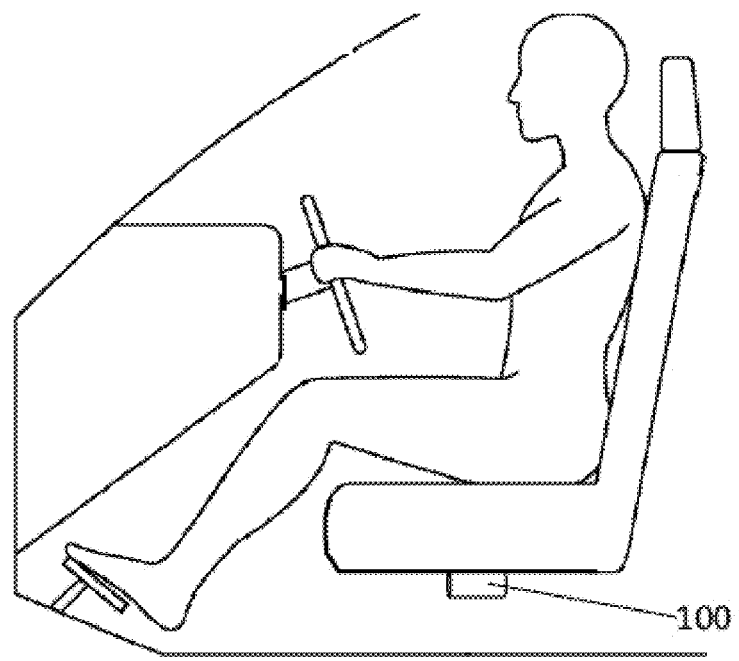
FIG. 7 shows an alternative embodiment where the safety device is mounted below the driver seat.

In some embodiments, as shown in FIG. 7, the safety device may be positioned directly under the driver's seat. In some embodiments, the safety device may be positioned directly under the passenger's seat. In some embodiments, as shown in FIG. 6, the safety device may be positioned near or at the steering column. In preferred embodiments, certain positions of the safety device in the vehicle combined with the relay control logic can save the most labor time since only one logic device would need to be installed, manufactured, housed, tested and packaged for use.

In an alternative embodiment, the safety device is configured to trigger if the vehicle is submerged in water. In an alternative embodiment, de-bounce logic is added to the circuit after the sensor to avoid false-triggering of the sensor leading to erroneous shutdown of the vehicle. In one embodiment, the safety device features an automatic reset, wherein the safety device latching relays reset to their reset positions after a given period of time. In one embodiment, the device can be activated by a panic button on the vehicle keychain or remote. In an alternative embodiment, the device can be interfaced with an alcohol breath analyzer to prevent drunk driving. In an alternative embodiment the tilt sensor can be used as a warning device for excessive climb or dive angles in an aircraft.

In an alternative embodiment, two or more tilt sensors are arranged at multiple angles, and wired in parallel, such that either sensor needs to trigger to activate the safety device. This configuration helps to prevent false triggers. In an alternative embodiment, two or more tilt sensors are arranged at multiple angles, and wired in series. This allows for different sensitivity to tilt in varying directions.

Figure 8:
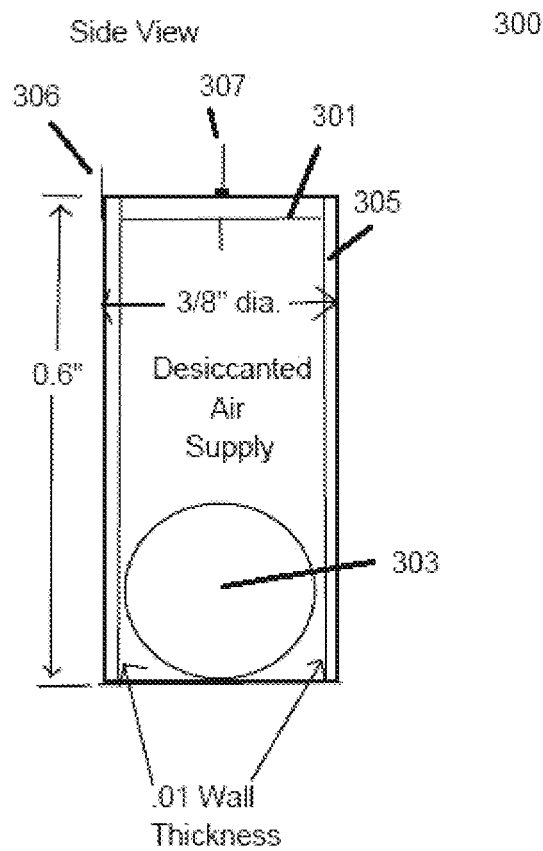
FIG. 8 shows an alternative embodiment of the end cap of the tilt sensor.
Figure 8:
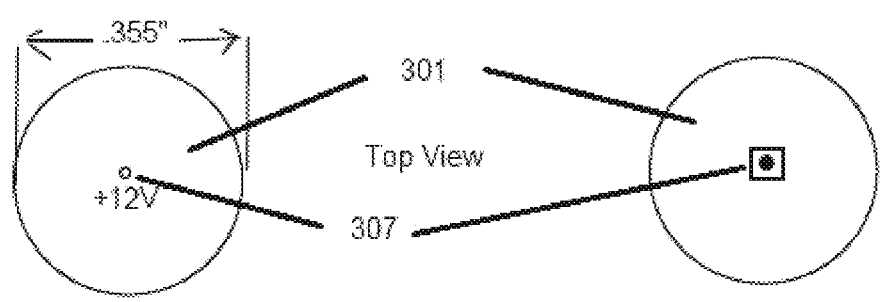

In an alternative embodiment of the tilt sensor, shown in FIG. 8, instead of two pins in which the ball bearing must make contact with, a single pin is disposed in the PCB end cap (301). The tube of the sensor (305) is made of a conductive material such that when the ball bearing (303) makes contact with the pin (307), current can flow through the ball bearing from the tube to the pin. In some embodiments, a second contact point (306) is soldered to the outside of the tube to create a second contact pin for the sensor.

In a typical embodiment all wires and relays are capable of handling 30 A at 12V DC current. In a preferred embodiment the invention is bagged in plastic to prevent contamination and is packaged with desiccant to keep its air supply dehumidified. The desiccant is important in keeping all moving parts operating when temperatures drop to sub-freezing and insuring all contact surfaces remain pristine.

Alternative Embodiment: Vehicle Security System

In an alternative embodiment, the device may be configured as an anti-theft device for vehicles that have none. The device may also be used to deter car high-jacking. The device can toggle between states with each test button press, the device could be used to apply optional practical security to every vehicle. Two separate lines between a push button switch on the steering column and Relay PCB would have to be added that just carries the toggle engine status signal (in blue—input to push button switch, and brown—output from PB switch). Inside the relay PCB housing, a +5 Volt Voltage regulator, Dual D flip flop receives input from the brown line and for each button press (or sensor trigger) toggles engine status (preset low, engine enabled). The output when combined through a logical or gate with the output of sensor status line, yields a prioritized "engine off" consideration. Power can be applied only long enough to set magnetic latching relay state to match that of the OR gate output. A mono-stable multi-vibrator may be programmed for the worst case amount of time for the relay's state to change. If the OR gate output is high, indicating engine off state desired, a reed relay is energized that grounds the magnetic relay's "set" output line, while after a slight capacitance delay, in conjunction with minimum grounding to provide rapid cap drain, it powers the "set" input line with 12 volts (or less if a limiting resistor is used) from a 5V DC base/12V DC emitter to collector transistor. To insure the SPDT reed relay is only energized long enough to set the magnetic relays, the output of the mono-stable multi-vibrator is applied directly to the base of a 5V-DC switching transistor which powers the reed relays. Use of a storage scope will be needed to debug logic timing. For the case when the output of the OR gate is low, indicating engine on condition, a reference of reed relay is assigned voltage off to connect the output line of the reset operation. In this case only, the 12V-DC needs to be timed properly to activate the reset input line. In summary, two additional lines and 4 ICs are needed.

Alternative Embodiment: Shut-Off when Vehicle is Submerged in Water

In another embodiment, the existing logic is to shut off the engine and fuel pump whenever the vehicle is submerged in water. This could be accomplished by adding a +5V DC regulator, and a fluid level detector IC to monitor two probe lines. One probe line could be connected to a non-bubble holding shielded probe located just behind the hood center. The second probe, with similar shielding, could be located just in front of the trunk lid center. When a minute current flows between probes, the shut off logic could be activated. In another embodiment, the probe terminals may be located within the engine compartment to prevent an arbitrary short of probe leads with a wire. Due to air trapped under the hood of the vehicle, it may take some time for the shut off logic to trigger.

Alternative Embodiment: Temperature Compensating SIP Controller

In an alternative embodiment, a Single Inline Processor (SIP) could be created such that Pin 1 is power, Pin 2 is USB instruction set download pin, N pins for input, M pins for output and last pin for ground. Temperature compensation is handled by using the worst case coldest environment as baseline standard. As the temperature increases, the operating system inputs enough no-ops to keep the processor executing at the baseline standard speed. Algorithm timing could then be used (based on inputs of sensor trigger and need to reset) to output relay reset stream control and sensor trigger shutoff. Computers cannot handle the temperature swings. Attached to the output at encircled A, a capacitor may be used with a resistor to ground for a 20 ms delay signal to shut off power (adding a new 16 Ga. output). By attaching power through the unused contacts of both single pole, double throw relays (when technology creates them), one can activate power shut down, the instant both relays indicate to do so.

Alternative Embodiment: RF Panic Button Engine Disable

In one embodiment, a hand held panic button on the key chain that has a protective slide cover so that it cannot be accidentally pushed, could be interfaced to permanently sound the horn for alert and disable the engine from operation. This would be useful to prevent a car hijacking, especially if the hijacker were outside the vehicle on the passenger side below window level.

Alternative Embodiment: Invention Application to Box Shaped Vehicles

Using a vacuum or pressure molded clear plastic tray to provide parts elevation above the stuffed PCB, two sensors may be placed in a "V" shape with 60° orientation from horizontal. This sensor configuration will trigger at a sideways 70° tip while still remaining reliable to not false trigger. A tip of 100° is required in the event of a vehicle flip. Wiring of the two sensors may be done through holes in the plastic tray in parallel and attached at the "sensor" solder holes. Compression of the housing back plate over the parts in tray will prevent sensor slippage. The safety device may be mounted against the wall (engine side) separating the engine from the cabin. An air supply notch may be included at the base of the sensor nearest the cotter pin as well as a recessed space for the cotter pin (both sides). In some embodiments, the referenced cotter pin is replaced with a wire as disclosed above. In some embodiments, an air supply notch in the pressure form molded tray is located at the sensor base.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the below claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed:

1. A vehicle safety rollover device, that upon detection of a vehicle rollover, automatically shuts-off power to an ignition system of said vehicle and shuts down an electrical system of said vehicle, said device comprising:
   a. at least one power input;
   b. a ground input operatively connected to a vehicle common ground;
   c. at least two latching relay switches, each comprising:
      i. an input;
      ii. two output positions;
      iii. a set pin; and
      iv. at least one reset pin;
   wherein an initial position of the latching relay switches is in the first output position, wherein when power is supplied to the set pin, the position switches to the second output position, wherein the reset pins are connected to the ground input;
   d. an ignition start input operatively connected to the input of the first latching relay switch;
   e. an ignition start output operatively connected to the first output position of the first latching relay switch;
   f. an electrical shut-off signal operatively connected to the second output position of the second latching relay switch, wherein the input of the second latching relay switch is operatively connected to the power input; and
   g. at least one sensor configured to supply power to the set pins of the latching relay switches when the sensor is activated;
   wherein initially, power flows through the first latching relay switch to an ignition starter of the ignition system, wherein the second latching relay switch disconnects the electrical shutoff signal from the power input, wherein when the sensor is activated, power flows from the power input to the set pins of the latching relay switches, causing the relay switches to switch positions from the first output position to the second output position, whereupon power to the ignition starter is disconnected, whereupon power flows to the electrical shutoff signal via the second latching relay switch, thereby causing the electrical system of the vehicle to shut down.

2. The device of claim 1, wherein the power is supplied from a battery power.

3. The device of claim 1, wherein the power is supplied from an alternator power.

4. The device of claim 1, wherein the power is supplied from an alternator power and a battery power, wherein the alternator power is connected to the sensor, wherein the sensor is connected to the set pin of the first latching relay switch, wherein the battery power is connected to the input of the second latching relay switch.

5. The device of claim 4, where the sensor is a tilt sensor comprising: a. a conductive tube; b. a conductive ball bearing disposed within the conductive tube, wherein the ball bearing is in electrical contact with an inner surface of the conductive tube; c. a top end cap, composed of an insulating material containing a printed circuit board disposed on a top end of the tube; d. a conductive pin disposed on the top end cap, and operatively connected to the battery power; and e. a transistor comprising a base pin, a collector pin, and an emitter pin, wherein the base pin is connected to the conductive tube, wherein the collector pin is connected to the alternator power, wherein the emitter pin is connected to the latching relay switches; wherein the tilt sensor is fixed to the body of the vehicle, wherein when the tilt sensor is upright position relative to gravity, the ball bearing rests on the bottom of the tube, causing the sensor to form an open circuit, wherein when the tilt sensor is tilted at least 90° relative to gravity, the ball bearing rolls onto the conductive pin to activate the tilt sensor, whereupon the tilt sensor forms a closed circuit such that current can flow through the conductive pin, the ball bearing, and tube, whereupon the current flows to the base pin of the transistor to open an electrical path from the battery power to the set pins of the latching relay switches.

6. The device of claim 1, comprising four latching relay switches, wherein two ignition switch motor-on inputs are connected to the inputs of a third and a fourth latching relay switches, wherein two ignition switch motor-on outputs are connected to the first outputs of the third and fourth latching relay switches, wherein initially, power flows through the third and fourth latching relay switches to the alternator power, wherein when the sensor is activated, power flows from the power input to the set pins of all four latching relay switches, causing the relay switches to switch positions, whereupon power to the ignition motor-on inputs and the ignition starter is disconnected, whereupon power flows to the electrical shutoff signal, thereby causing the electrical system of the vehicle to shut down, disable all accessories, notify an overseeing computer, summon an emergency response and/or depressurize a plurality of fuel lines.

7. The device of claim 1 further comprising a dual in-line package (DIP) switch having a plurality of DIP switch positions, wherein each latching relay switch has two reset pins, wherein connecting a first reset pin to the ground input causes the respective latching relay switch to switch to the second output position when power is applied to the set pin, wherein connecting a second reset pin causes the respective latching relay switch to switch to the first output position when power is applied to the set pin, wherein the DIP switch positions are connected to the two reset pins of the respective latching relay switches, wherein the final position of the DIP switch bypasses the sensor, wherein the DIP switches are nominally set such that the ground input is connected to the first reset pin and disconnected from the second reset pin, wherein to reset the device, the DIP switch positions are reversed so that the ground input is connected to the second reset pin of each latching relay switch, whereupon when the final DIP switch position is flipped, power is supplied to the latching relay switches, which causes them to switch to the original first output position, whereupon the device is reset and the DIP switch positions is reversed to their original positions, wherein as a result, the DIP switch permits all logic in the device to be tested prior to release.

8. The device of claim 1, wherein the sensor is a water submergence sensor, configured to send a set signal when the vehicle is submerged in water.

9. The device of claim 1, wherein the sensor is triggered by a panic button on a key chain.

10. The device of claim 5 further comprising two or more tilt sensors, wherein the two tilt or more sensors are connected in parallel, wherein the two tilt or more sensors are oriented at opposite angles, such that when the vehicle tilts in either direction by an angle sufficient to make at least one of the tilt sensors to tilt by more than 90 relative to gravity, one of the tilt sensors is activated.

* * * * *